US009661862B2

(12) United States Patent
Hou et al.

(10) Patent No.: US 9,661,862 B2
(45) Date of Patent: May 30, 2017

(54) MOLD RIPENED CHEESE AND PREPARATION METHOD THEREOF

(71) Applicant: Bright Dairy & Food Co., Ltd., Minhang District (CN)

(72) Inventors: Jianping Hou, Shanghai (CN); Benheng Guo, Shanghai (CN); Huaning Yu, Shanghai (CN); Feng Hang, Shanghai (CN); Zhenmin Liu, Shanghai (CN); Xin Song, Shanghai (CN); Haibo Mu, Shanghai (CN)

(73) Assignee: Bright Dairy & Food Co., Ltd, Shanghai (CN)

( * ) Notice: Subject to any disclaimer, the term of this patent is extended or adjusted under 35 U.S.C. 154(b) by 0 days.

(21) Appl. No.: 15/023,891

(22) PCT Filed: Aug. 14, 2014

(86) PCT No.: PCT/CN2014/084346
§ 371 (c)(1),
(2) Date: Mar. 22, 2016

(87) PCT Pub. No.: WO2015/039511
PCT Pub. Date: Mar. 26, 2015

(65) Prior Publication Data
US 2016/0227805 A1    Aug. 11, 2016

(30) Foreign Application Priority Data

Sep. 23, 2013    (CN) .......................... 2013 1 0436454

(51) Int. Cl.
A23C 9/12 (2006.01)
A23C 19/068 (2006.01)
A23C 19/032 (2006.01)
A23C 19/16 (2006.01)

(52) U.S. Cl.
CPC ...... *A23C 19/0682* (2013.01); *A23C 19/0326* (2013.01); *A23C 19/16* (2013.01); *A23C 2250/30* (2013.01)

(58) Field of Classification Search
CPC . A23C 19/0682; A23C 19/0326; A23C 19/16; A23C 2250/30
USPC ............ 426/34, 36, 37, 38, 42, 43, 580, 582
See application file for complete search history.

(56) References Cited

U.S. PATENT DOCUMENTS

| 7,993,903 B2* | 8/2011 | Hayakawa | A23L 2/52 424/93.4 |
| 9,011,949 B2* | 4/2015 | Brown | A23C 20/005 426/63 |
| 2013/0280227 A1* | 10/2013 | Buonamici | A23C 9/13 424/94.1 |

FOREIGN PATENT DOCUMENTS

| CN | 102429043 | 5/2012 |
| CN | 102429043 B | 12/2012 |
| CN | 103300154 | 9/2013 |
| CN | 103461515 A | 12/2013 |
| WO | WO 2004/062385 | * 7/2004 |

OTHER PUBLICATIONS

Guo et al., CN 103734351, Apr. 23, 2014, abstract.*
Mar. 26, 2010 GB5420-2010 National food safety standard Cheese issued in China.
Mar. 26, 2010 GB25192-2010 National food safety standard Process(ed) cheese issued in China.
Apr. 4, 2014 Notification of the First Office Action issued in Chinese Patent Application CN103461515A.
New Zealand Patent Application No. 718459 (not published), filed Mar. 29, 2016.
Nov. 19, 2014 English language translation of International Search Report issued in International Patent Application No. PCT/CN2014/084346.
Nov. 15, 2014 English language translation of Written Opinion of the International Searching Authority issued in International Patent Application No. PCT/CN2014/084346.
International Search Report and Written Opinion for PCT/CN2014/084346 dated Oct. 29, 2014.

* cited by examiner

*Primary Examiner* — Leslie Wong
(74) *Attorney, Agent, or Firm* — Andrus Intellectual Property Law, LLP

(57) ABSTRACT

A method for preparing mold ripened cheese, comprising the following steps: (1). Sterilizing raw milk and cooling to obtain treated milk, inoculating the treated milk with *Penicillium camemberti*, *Monascus* sp. and Lactic acid bacteria leavening agent, fermenting until the pH value is 5.8 to 6.5, and adding chymosin to obtain curded milk; (2). placing the curded milk into a mold for molding so as to obtain a curd block; (3). brine salting or dry salt coating the curd block to ripen the curd block; the ripening method being: ripening at 20° C.-30° C. for 2-15 days, ripening at 12° C.-20° C. for 2-15 days, and ripening at 4° C.-15° C. for 10-45 days.

8 Claims, 1 Drawing Sheet

MOLD RIPENED CHEESE AND PREPARATION METHOD THEREOF

CROSS REFERENCE TO RELATED APPLICATIONS

The present application is the U.S. national stage application of International Application No. PCT/CN2014/084346, filed Aug. 14, 2014, which application was published on Mar. 26, 2015, as WO2015/039511, further which application claims priority of Chinese Application CN201310436454.9, filed on Sep. 23, 2013, the entire contents of which are incorporated herein by reference in their entireties.

FIELD OF INVENTION

The present invention relates to a mold ripened cheese and preparation method thereof.

PRIOR ARTS

The cheeses are of numerous qualities, and the soft cheese is particularly popular with the western consumers for its delicate taste, the consumption of which increases significantly every year. Typical soft cheese, the Camembert mold-ripened cheese, is of particularly significant growth in consumption due to its exquisite texture and good absorbency. China starts relatively late in term of research on the production technology of cheeses, and lacks the key production technology of cheeses with proprietary intellectual property rights, and therefore a lag in the technology seriously restricts the production efficiency and quality of cheeses. The output of cheeses is extremely low in China and most of natural cheese products rely on imports. But the acceptance level of the imported cheeses is not high to the Chinese consumers due to its over-rich flavor. How to improve according to the Chinese consumers' demand, retaining the characteristics of natural cheese itself while employing Chinese traditional strains and adjusting the process, to obtain the cheese in accordance with Chinese diet habits, improving the consumers' recognition, greatly improve the acceptance level of consumers to this kind of cheese.

At present, two popular mold ripened cheeses are white mold-ripened cheese and blue cheese, and a typical one of the white mold-ripened cheese is the Camembert cheese which is ripened by employing *Penicillium camemberti*, while the blue cheese is ripened by employing *Penicillium Roqueforti*.

It has a long history for the application of *Monascus* in China, and a large number of traditional foods are fermented by utilizing the effects of *Monascus* (such as red yeast rice, red starter wine, preserved beancurd, etc.). As the cholesterol synthesis inhibitor capable of reducing cholesterol is isolated from the culture medium of *Monascus*, as well as a number of physiological active substances in *Monascus* have other health functions (e.g. lowering blood pressure, anti-oxidation, anti-fatigue, inhibiting hypertrophy of fat cells, etc.), the related researches on *Monascus* are growing, which results in the attention in various circles and the beginning of developing *Monascus* related food to a large extent. *Monascus* has been widely used in the traditional foods in China, and the foods made therefrom are in accordance with the Chinese habit in terms of flavor and taste, and thus the researches on this aspect in China have great resources superiority.

SUMMARY OF THE INVENTION

The technical problem to be solved by the present invention is to overcome the defects of a long preparation cycle for the traditional mold-ripened cheese, a stimulating flavor such as bitter and spicy, etc. occurring at high temperature, and low Chinese consumer acceptance, and to provide a mold-ripened cheese and preparation method thereof. The preparation method of the present invention, on one hand, ensures a good growth of *Monascus* sp. and meanwhile prevents the *Penicillium camemberti* from producing a bitter flavor; on the other hand, employing *Monascus* sp. and *Penicillium camemberti* to ripen can improve an irritant flavor of the traditional cheese and reduce ripening cycle, and provide the cheese with a more soft flavor and typical milk fragrance suitable for Chinese consumers.

The main problem during the development of the present invention is how to ensure the taste of the cheese such that the prepared cheese will not have a stimulating flavor such as bitter and spicy, etc. The normal temperature for *Monascus* sp. growth is 20-35. However, the cheese prepared at such normal temperature suitable for *Monascus* sp. growth will produce and accumulate too many bitter peptides, and will more easily produce a bad flavor when *Penicillium camemberti* is used in combination during the preparation of the ripened cheese. In order to solve the above technical problem, the inventor investigated in-depth on the cheese preparation process and eventually found out that the above object can be achieved by the overall synergies between specific strains and control of a particular ripening temperature, together with other process steps and conditions.

The present invention provides a preparation method for mold-ripened cheese, which comprises the following steps:

(1). Sterilizing and cooling raw milk to give treated milk, inoculating the treated milk with *Penicillium camemberti*, *Monascus* sp. and Lactic acid bacteria fermentation agent, fermenting to a pH value of 5.8-6.5, adding rennin to give curds;

(2). Placing the curds into a mould, and shaping to give curd blocks;

(3). Salting or smearing the curd blocks with dry salt, ripening; the process of the ripening including: ripening for 2-15 days at 20-30° C., continuing to ripen for 2-15 days at 12-20° C., followed by ripening for 10-45 days at 4-15° C.

In step (1), the *Penicillium camemberti* can be common *Penicillium camemberti* in the art. The *Penicillium camemberti* preferably is in the form of freeze-dried spore powder. The freeze-dried spore powder of the *Penicillium camemberti* is preferably the freeze-dried spore powder of GE017 *Penicillium camemberti*, supplied by Danisco Co. Ltd. The method of utilizing the freeze-dried spore powder of the *Penicillium camemberti* can be common in the art, and preferably: suspending the freeze-dried spore powder of the *Penicillium camemberti* into sterile water or a culture solution of the *Monascus* sp. to give a suspension. An addition amount of the freeze-dried spore powder of the *Penicillium camemberti* can be common in the art, and preferably is 0.01%-0.05% relative to the mass of the raw milk.

In step (1), the *Monascus* sp. is safe and complies with the regulations in the food industry. Preferably, the *Monascus* sp. is the one deposited with the China General Microbiological Culture Collection Center (CGMCC) on May 8, 2013, with the access No. (CGMCC No.) 7603.

The *Monascus* sp., when used, preferably, undergoes a pre-treatment to give a culture solution of *Monascus* sp., and the method and condition of the pre-treatment can be those commonly used in the art. Preferably, the method and condition of the pre-treatment are: inoculating the freezing-stored *Monascus* sp. into a culture medium of the *Monascus* sp., activating till the amount of the *Monascus* sp. in the medium is $10^6 \sim 10^7$ cfu/mL.

The formulation of the culture medium of the *Monascus* sp. can be common in the art, and preferably is: glucose 30-50 g/L, potato extract powder 3-5 g/L, $MgSO_4$ 0.1-0.5 g/L and $K_2HPO_4$ 0.1-0.5 g/L.

In step (1), the *Monascus* sp., when added, preferably is in the form of the culture solution of the *Monascus* sp. An addition amount of the culture solution of the *Monascus* sp. can be common in the art, and preferably is 0.1%-0.5% relative to the mass of the raw milk. In the culture solution of the *Monascus* sp., the amount of the *Monascus* sp. is $10^6$-$10^7$ cfu/mL.

In step (1), the Lactic acid bacteria fermentation agent can be those commonly used for the cheese preparation in the art. The Lactic acid bacteria in the Lactic acid bacteria fermentation agent preferably is one or more of *Lactococcus lactis* subsp. *cremoris, Lactococcus lactis* subsp. *lactis*, and *Lactococcus lactis* subsp. *lactis* biovar. diacetylactis.

The Lactic acid bacteria fermentation agent preferably is any one or more of R-704 fermentation agent supplied by Chr-Hansen Co. Ltd, MM100 fermentation agent supplied by Danisco Co. Ltd, and LL-50 fermentation agent supplied by DSM Co. Ltd.

An addition amount of the Lactic acid bacteria fermentation agent can be common in the art, preferably 0.6 g-2.0 g the Lactic acid bacteria fermentation agent inoculated per 100 L of the treated milk; more preferably 1.5 g the Lactic acid bacteria fermentation agent inoculated per 100 L of the treated milk.

In step (1), the raw milk can be those common in the art, and preferably the standard-conforming fresh milk and/or reconstituted milk. The fresh milk can be those common in the art, and preferably one or more of cow's milk, mare's milk, goat's milk and camel's milk. The fresh milk is commonly accordance with the standard GB-19301 "The National Food Safety Standard for The Raw Milk".

In step (1), the method and the condition used for sterilizing can be those commonly used in the art, and preferably one or more of pasteurization, ultra-high temperature sterilization, and sterilization with membrane filtration. The pasteurization preferably is performed by sterilizing the raw milk for 15-60 s at 70-72° C. The sterilization with membrane filtration preferably is performed by filtering the raw milk through a semipermeable membrane to directly remove the microorganism without a heating treatment.

In step (1), the temperature for the cooling can be common in the art, preferably 28-35° C., more preferably is 30-33° C.

In step (1), the temperature for the fermenting can be common in the art, preferably 28-35° C., more preferably 30-33° C.

In step (1), the rennin can be those commonly used in the art, preferably the rennin of calf stomach and/or microbial rennin. An addition amount of the rennin can be common addition amount in the art, preferably 1.0 g-2.0 g addition of the rennin per 100 L of the treated milk, and more preferably 1.2 g-1.8 g addition of the rennin per 100 L of the treated milk. The time period for curdling can be common in the art, preferably 30-50 mins.

In step (2), the method and condition used for placing the curds into the mould can be those commonly used in the art, with or without suppressing as required by the texture of the cheese, without affecting the flavor of the cheese.

In step (2), the temperature for the shaping can be those common in the art, and preferably 12-20° C. The shaped curds can be rolled-over periodically according to the common operation in the art.

In step (3), the method of the ripening preferably is performed by: ripening for 5-10 days at 20-30° C., continuing to ripen for 5-10 days at 12-20° C., followed by ripening for 20-25 days at 4-15° C.

In step (3), the method and condition of the salting can be those common in the art, preferably salting with saline. The concentration of the saline can be those common in the art, preferably 15-25 wt %. Whether salting with the saline and/or smearing with dry salt, the eventual purpose is to keep the salt content in the prepared mold-ripened cheese preferably at 1-4%, with the percentage being mass percent.

In step (3), the ripening is conducted in a ripening chamber. The environmental relative humidity for the ripening preferably is 85-95%.

The present invention further provides the mold-ripened cheese prepared by the preparation method above.

The above-mentioned various optimized conditions can be optionally combined in accordance with the general knowledge in this field to obtain the various preferred embodiments of the invention.

The reagents and the raw materials used in the invention are all commercially available.

The positive effects of the present invention are as follows:

1. The present invention employs the *Monascus* sp. and *Penicillium camemberti* for ripening during the preparation of the mold-ripened cheese, and takes advantage of the influence on the growth of the *Penicillium camemberti* caused by the *Monascus* sp., and reduces the stimulating flavor, such as spicy, of the traditional mold-ripened cheese, which provides the mold-ripened cheese of the present invention with a milder flavor and prominent milk fragrance suitable for Chinese consumers. The maturity degree of the mold-ripened cheese are assessed and indicated by the color change of the pigment produced by the *Monascus* sp. under the action of the *Penicillium camemberti*.

2. The present invention employs the *Monascus* sp. and *Penicillium camemberti* for ripening the cheese. Compared with the traditional cheese, the mold-ripened cheese of the present invention has new features in terms of color and shape, and makes a breakthrough on the rigid thinking of the traditional *Monascus* sp. usage, and also provides the mold-ripened cheese with new product features.

3. The present invention fills a gap both at home and abroad in the field of the researches on the *Monascus* sp. cheese, and provides a new direction for the researches on adapting a flavor of good food abroad to the Chinese consumption habits. The mutual effect of the *Monascus* sp. and the *Penicillium camemberti* improves the inadaptation of the Chinese dietetic flavor to the traditional cheese, and meanwhile, as the physiological active substances produced by the *Monascus* sp. in the cheese ripening process provide the traditional cheese with new functions, the cheese ripened by the *Monascus* sp. of the present invention improves the nutritional value and the health care effect of the traditional cheese.

Detailed Description of the Microorganism Deposit

The *Monascus* sp. GL-1 strain used in the present invention, has been deposited with the China General Microbiological Culture Collection Center (CGMCC) on May 8, 2013. Deposition address is: No. 3, Yard No. 1, West Beichen Road, Chaoyang District, Beijing. Postal code is: 100101. The Access No. is: CGMCC No. 7603.

DETAILED DESCRIPTION OF THE INVENTION

Figure 1:
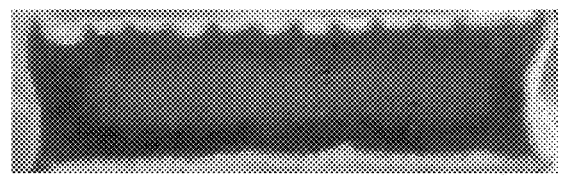
FIG. 1 is a photograph showing the internal uniformity of the mold-ripened cheese during the ripening process in Example 1.

The present invention will be further illustrated by the following examples, but the present invention is not limited to the scope of the examples. In the following examples, the experimental methods without specific conditions, are selected in accordance with the conventional methods and conditions, or in accordance with the commodity specifications.

Example 1

(1). 100 L raw milk was sterilized for 15 s at 72° C., and then cooled to 33° C. to give the treated milk. 0.01% freeze-dried spore powder of the *Penicillium camemberti*, 0.1% culture solution of the *Monascus* sp., and 1.5 g Lactic acid bacteria fermentation agent were added into the treated milk, which was cultured at a constant temperature of 33° C. till a pH value down to 5.8 and to which was added 1.8 g rennin and was allowed to curdle for 50 min to give curds. The percentages were those accounting for the mass of the raw milk. The amount of the *Monascus* sp. comprised in the culture solution of the *Monascus* sp. was $10^6 \sim 10^7$ cfu/mL.

(2). The curds in the step (1) were placed into the mould, and then with or without suppressing were shaped at 12° C. and rolled-over on time.

(3). The curd blocks were salted with 15% saline, ripened for 10 days at 22° C., continued to be ripened for 5 days at 18° C., followed by ripening for 20 days at 10° C. till completely ripening. Throughout the ripening period, the environmental relative humidity was 85%. The mold-ripened cheese was then obtained.

The formulation of the culture medium of the *Monascus* sp. was: glucose 30 g/L, potato extract powder 3 g/L, $MgSO_4$ 0.1 g/L and $K_2HPO_4$ 0.1 g/L.

Example 2

(1). Raw milk was sterilized for 60 s at 70° C., and then cooled to 30° C. to give the treated milk. 0.05% freeze-dried spore powder of the *Penicillium camemberti*, 0.5% culture solution of the *Monascus* sp., and 1.5 g Lactic acid bacteria fermentation agent were added into 100 L the treated milk, which was cultured at a constant temperature of 30° C. till a pH value down to 6.5 and to which was added 1.2 g Rennin and was allowed to curdle for 50 min to give curds. The percentages were those accounting for the mass of the raw milk. The amount of the *Monascus* sp. comprised in the culture solution of the *Monascus* sp. was $10^6$-$10^7$ cfu/mL.

(2). The curds in the step (1) was placed into a mould, and then with or without suppressing was shaped at 20° C. and were rolled-over on time.

(3). The curd blocks was salted with 25% saline, ripened for 5 days at 25° C., continued to be ripened for 10 days at 15° C., followed by ripening for 25 days at 8° C. till completely ripening. Throughout the ripening period, the environmental relative humidity was 95%. The mold-ripened cheese was then obtained.

The formulation of the culture medium of the *Monascus* sp. was: glucose 50 g/L, potato extract powder 5 g/L, $MgSO_4$ 0.5 g/L and $K_2HPO_4$ 0.5 g/L.

Example 3

(1). Raw milk was sterilized for 40 s at 71° C., and then cooled to 31° C. to give the treated milk. 0.025% freeze-dried spore powder of the *Penicillium camemberti*, 0.25% culture solution of the *Monascus* sp., and 1.5 g Lactic acid bacteria fermentation agent were added into 100 L of the treated milk, which was cultured at a constant temperature of 31° C. till a pH value down to 6.0 and to which was added 1.5 g Rennin and was allowed to curdle for 45 min to give curds. The percentages were those accounting for the mass of the raw milk. The amount of the *Monascus* sp. comprised in the culture solution of the *Monascus* sp. was $10^6$-$10^7$ cfu/mL.

(2). The curds in the step (1) were placed into a mould, and then with or without suppressing were shaped at 18° C. and were rolled-over on time.

(3). The curd blocks were salted with 20% saline, ripened for 7 days at 23° C., continued to be ripened for 7 days at 16° C., followed by ripening for 25 days at 9° C. till completely ripening. Throughout the ripening period, the environmental relative humidity was 90%. The mold-ripened cheese was then obtained.

The formulation of the culture medium of the *Monascus* sp. was: glucose 40 g/L, potato extract powder 4 g/L, $MgSO_4$ 0.25 g/L and $K_2HPO_4$ 0.25 g/L.

Comparative Example 1

(1). Raw milk was sterilized for 40 s at 71° C., and then cooled to 31° C. to give the treated milk. 0.025% freeze-dried spore powder of the *Penicillium camemberti*, and 1.5 g Lactic acid bacteria fermentation agent were added into 100 L of the treated milk, which was cultured at a constant temperature of 31° C. till a pH value down to 6.0 and to which was added 1.5 g Rennin and was allowed to curdle for 45 min to give curds.

(2). The curds in the step (1) were added into a mould, and then with or without suppressing was shaped at 18° C. and were rolled-over on time.

(3). The curd blocks were salted with 20% saline, ripened for 7 days at 18° C., continued to be ripened for 10 days at 12° C., followed by ripening for 25 days at 8° C. till total ripening. Throughout the ripening period, the environmental relative humidity was 90%. The mold-ripened cheese was then obtained.

Comparative Example 2

(1). Raw milk was sterilized for 40 s at 71° C., and then cooled to 31° C. to give the treated milk. 0.025% freeze-dried spore powder of the *Penicillium camemberti*, 0.25% culture solution of the *Monascus* sp., and 1.5 g Lactic acid bacteria fermentation agent were added into 100 L of the treated milk, which was cultured at a constant temperature of 31° C. till a pH value down to 6.0 and to which was added 1.5 g Rennin and was allowed to curdle for 45 min to give curds. The percentages were those accounting for the mass of the raw milk. The amount of the *Monascus* sp. comprised in the culture solution of the *Monascus* sp. was $10^6$-$10^7$ cfu/mL.

(2). The curds in the step (1) were placed into a mould, and then with or without suppressing was shaped at 18° C. and were rolled-over on time.

(3). The curd blocks were salted with 20% saline, ripened for 7 days at 35° C., continued to be ripened for 7 days at 25° C., followed by ripening for 7 days at 18° C. till completely ripening. Throughout the ripening period, the environmental relative humidity was 90%. The mold-ripened cheese was then obtained.

The formulation of the culture medium of the *Monascus* sp. was: glucose 40 g/L, potato extract powder 4 g/L, $MgSO_4$ 0.25 g/L and $K_2HPO_4$ 0.25 g/L.

The steps in Comparative Examples 1 and 2 are the same as those in the Example 3, and the difference lies in that, in the step (1) of Comparative Example 1, no culture solution of the *Monascus* sp. was added and the traditional mold-ripened cheese was prepared. The flavor of the traditional mold-ripened cheese will be affected by a too high temperature while ripening, and therefore a lower temperature for ripening is required and also the ripening period is longer than that in Example 3. The temperature and days for ripening in Comparative Example 2 are different from those in Example 3.

The sensory evaluation standard of the mold-ripened cheese, which is formulated comprehensively according to Chinese Standards GB25192-2010 and GB5420-2010, is shown in Table 1. The mold-ripened cheese prepared according to Examples 1-3 and the traditional cheese prepared according to Comparative Examples 1-2 were evaluated. The results are shown in Table 2.

TABLE 1

| Item | Characteristics |
|---|---|
| Texture | Uniform, appropriate hardness, fine and smooth, be of plasticity. (0-20 points) |
| Appearance | Uniform color, smooth, soft and glossy. (0-30 points) |
| Flavor | be of unique taste and smell of the cheese, without unpleasant smell. (0-20 points) |
| Taste | Moderate chewiness, with mild milk flavor. (0-30 points) |

TABLE 2

| Item | Appearance | Texture | Flavor | Taste | Total points |
|---|---|---|---|---|---|
| Example 1 | 18.74 ± 0.57 | 24.81 ± 0.13* | 17.00 ± 0.21 | 27.80 ± 0.57* | 88.18 ± 2.87 |
| Example 2 | 18.34 ± 0.15 | 24.90 ± 0.62* | 17.71 ± 0.36* | 27.25 ± 0.66* | 87.81 ± 1.43 |
| Example 3 | 18.11 ± 0.26* | 24.92 ± 0.14* | 18.83 ± 0.63* | 27.50 ± 0.47* | 90.16 ± 1.38* |
| Comparative Example 1 | 17.54 ± 0.14 | 24.68 ± 0.13 | 16.02 ± 0.26 | 25.95 ± 0.15 | 85.48 ± 2.34 |
| Comparative Example 2 | 10.45 ± 0.12* | 15.76 ± 0.11* | 10.20 ± 0.20* | 15.59 ± 0.13* | 55.48 ± 2.34* |

Note:
*refers to Significant difference.

From the sensory evaluation results it can be seen that, compared with the traditional mold-ripened cheese prepared according to Comparative Example 1, the mold-ripened cheeses prepared according to Examples 1-3 of the invention have no significant difference in texture, but in terms of appearance and flavor are significantly superior to the traditional cheese. It is probably because the internal color of the mold-ripened cheese prepared by the *Monascus* sp. and the *Penicillium camemberti* is red while the surface color is white as the traditional mold-ripened cheese, which breaks people's view on the traditional mold-ripened cheese and makes people feel fresh. Due to the too high temperature for ripening, all the sensory evaluation data of Comparative Example 2 are significantly lower than those of Examples 1-3 and Comparative Example 1. The mold-ripened cheese prepared according to Comparative Example 2 has the defects such as folds appeared on the surface similar to toad skin itch, softer texture, deformation behavior etc., a stimulating and strong flavor and a very bitter taste. The main reason is the overgrowth of the *Monascus* sp. and the *Penicillium camemberti*.

By controlling the temperature during ripening the mold-ripened cheese, the interaction between the *Monascus* sp. and the *Penicillium camemberti* and programmed temperature control, even if the ripening temperature is higher than that of the traditional mold-ripened cheese, the present invention will exhibit no pungent flavor as the traditional mold-ripened cheese has. At the same time, the relatively high ripening temperature can accelerate the ripening of the cheese, and shorten the ripening time of the cheese. Thus, it is can be seen that the mold-ripened cheese of the present invention not only can be comparable to the traditional mold-ripened cheese, but be superior to the traditional mold-ripened cheese in terms of appearance and flavor, and has a promising prospect for commercial application.

Figure 2:
FIG. 2 is a photograph showing the internal uniformity of the mold-ripened cheese after the ripening process in Example 1.

The photographs showing the uniformity of the internal color of the mold-ripened cheese prepared according to Example 1 during and after the ripening process are shown in FIGS. 1 and 2, respectively. As can be seen in FIGS. 1 and 2, the internal color of the cheese is uniform when it is completely ripened.

Although the foregoing have described the specific embodiments of the invention, a person skilled in the art should understand that these are intended to be purely illustrative of the invention, and various changes and variations may be made to these embodiments without departing from the principle and substance of the present invention. Therefore, the protection scope of the present invention is limited by the following claims.

What is claimed is:

1. A preparation method for a mold-ripened cheese, comprising the following steps:

(1) sterilizing and cooling raw milk to give treated milk, inoculating the treated milk with *Penicillium camemberti*, *Monascus* sp. and *Lactic acid bacteria* fermentation agent, fermenting to a pH value of 5.8-6.5, adding rennin to give curds; wherein the *Monascus* sp. comprises the *Monascus* sp. with the access No. (CG-MCC No.) 7603 and the Lactic acid bacteria in the Lactic acid bacteria fermentation agent comprises one or more of *Lactococcus lactis* subsp. *cremoris*, *Lactococcus lactis* subsp. *lactis*, and *Lactococcus lactis* subsp. *lactis* biovar. *diacetylactis*;

(2) placing the curds into a mould, and shaping to give curd blocks;

(3) salting or smearing the curd blocks with dry salt, ripening; the process of the ripening including: ripening for 2-15 days at 20~30° C., continuing to ripen for 2-15 days at 12-20° C., followed by ripening for 10-45 days at 4-15° C.

2. The preparation method according to claim 1, characterized in that in step (1), the *Penicillium camemberti* is in the form of freeze-dried spore powder; the method for using the freeze-dried spore powder of the *Penicillium camemberti* is: suspending the freeze-dried spore powder of the *Penicillium camemberti* into sterile water or a culture solution of the *Monascus* sp. to give a suspension; an addition amount of the freeze-dried spore powder of the *Penicillium camemberti* is 0.01%-0.05% relative to the mass of the raw milk.

3. The preparation method according to claim 1, characterized in that in step (1), the *Monascus* sp., undergoes a pre-treatment to give a culture solution of the *Monascus* sp., the method and condition of the pre-treatment is: inoculating the freezing-stored *Monascus* sp. into a culture medium of the *Monascus* sp., activating until an amount of the *Monascus* sp. in the medium is $10^6$-$10^7$ cfu/mL; and an addition amount of the culture solution of the *Monascus* sp. is 0.1%-0.5% relative to the mass of the raw milk.

4. The preparation method according to claim 1, characterized in that in step (1), an addition amount of the Lactic acid bacteria fermentation agent is 0.6 g-2.0 g the Lactic acid bacteria fermentation agent per 100 L of the treated milk.

5. The preparation method according to claim 1, characterized in that in step (1), the raw milk is fresh milk and/or reconstituted milk; the fresh milk is one or more of cow's milk, mare's milk, goat's milk and camel's milk; the method for the sterilizing is one or more of pasteurization, ultra-high temperature sterilization, and sterilization with membrane filtration; and the pasteurization is performed by sterilizing the raw milk for 15-60 s at 70-72° C.

6. The preparation method according to claim 1, characterized in that in step (1), the temperature for the cooling is 28-35° C.; the temperature for the fermenting is 28-35° C.; the rennin is the rennin of calf stomach and/or microbial rennet; an addition amount of the rennin is 1.0 g-2.0 g of the rennin per 100 L of the treated milk; and the time period for curdling is 30-50 mins.

7. The preparation method according to claim 1, characterized in that in step (2), the temperature for the shaping is 12-20° C.

8. The preparation method according to claim 1, characterized in that in step (3), the method for the ripening is: ripening for 5-10 days at 20-30° C., continuing to ripen for 5-10 days at 12-20° C., followed by ripening for 20-25 days at 4-15° C.; the salting is salting with saline; the concentration of the saline is 15-25 wt %; the salt content in the mold-ripened cheese is 1%-4%, the percentage is mass percent; and the environmental relative humidity for the ripening is 85%-95%.

* * * * *